(12) United States Patent  (10) Patent No.: US 7,296,553 B2
Osman  (45) Date of Patent: Nov. 20, 2007

(54) ENGINE BALANCER APPARATUS

(75) Inventor: Azmi B. Osman, Johor (MY)

(73) Assignee: Petroliam Nasional Berhad, Kuala Lumpur (MY)

( * ) Notice: Subject to any disclaimer, the term of this patent is extended or adjusted under 35 U.S.C. 154(b) by 0 days.

(21) Appl. No.: 11/545,358

(22) Filed: Oct. 10, 2006

(65) Prior Publication Data

US 2007/0079786 A1   Apr. 12, 2007

(30) Foreign Application Priority Data

Oct. 11, 2005   (MY) .............................. PI 20054776

(51) Int. Cl.
 *F02B 75/06*   (2006.01)
(52) U.S. Cl. ..................... 123/192.2; 74/603
(58) Field of Classification Search ............. 123/192.2; 74/603
See application file for complete search history.

(56) References Cited

U.S. PATENT DOCUMENTS

| | | | | |
|---|---|---|---|---|
| 2,914,963 A | * | 12/1959 | Scherenberg | ................. 74/604 |
| 3,402,707 A | * | 9/1968 | Heron | ...................... 123/192.2 |
| 5,305,656 A | | 4/1994 | Kamiya et al. | |
| 5,535,643 A | * | 7/1996 | Garza | ...................... 123/192.2 |
| 5,875,753 A | | 3/1999 | Ishikawa | |
| 6,305,339 B1 | * | 10/2001 | Iwata et al. | .............. 123/192.2 |
| 6,382,165 B1 | | 5/2002 | Hirose et al. | |
| 2001/0023623 A1 | * | 9/2001 | Killion | .................... 123/192.2 |

FOREIGN PATENT DOCUMENTS

DE   3913741 A1 * 10/1990
JP   2002-122028   4/2002

OTHER PUBLICATIONS

Website printout of Ford Scorpio 2.3 Engine Overview Pt 3 dated Jun. 6, 2005 (3 pages).

* cited by examiner

*Primary Examiner*—Noah P. Kamen
(74) *Attorney, Agent, or Firm*—Dickinson Wright PLLC

(57) ABSTRACT

A balancer apparatus including a first balancer and a second balancer. The first balancer includes a first balance weight and the second balancer includes a second balance weight and wherein the first and second balance weights are asymmetrical. The first and second balancers include first and second center of gravities that are longitudinally aligned when the first and second balancers are assembled in a housing.

21 Claims, 6 Drawing Sheets

ENGINE BALANCER APPARATUS

CROSS-REFERENCE TO RELATED APPLICATION

This application is based upon and claims priority to Malaysian Patent Application No. PI 20054776, filed Oct. 11, 2005, which application is hereby expressly incorporated by reference.

BACKGROUND OF THE INVENTION

The present invention relates to a balancer apparatus for suppressing vibrations in an engine and, more particularly, to a compact balancer apparatus which suppresses or cancels out inertial force and/or inertial couple forces induced by pistons, connecting rods, shafts and the like when the engine is running.

When individual movable portions of an engine become off balance during operation, vibrations occur. Such vibrations generate noise, contribute to wear, and may be felt by the operator or occupants of a vehicle containing the engine. To reduce these vibrations, a balancer assembly is typically used to cancel or suppress vibrations of the engine. The balancer assembly operates by providing vibrations opposite to the engine vibrations so that the vibrations cancel each other or reduce the overall magnitude of the engine vibrations.

The balancer assemblies include balancers that produce measured vibrations. Most balancer assemblies include at least two shafts wherein one of the shafts is driven by the crank shaft and the other shaft is driven by either the crank shaft or the other balancer. The vibrations produced by the balancer assemblies are measured for time and intensity. To effectively cancel or reduce the effect of an engine vibration, the vibration produced by the balancer assembly is timed to occur at the same time the engine vibration is expected to occur. More specifically, the vibration produced by the balancer assembly is opposite in magnitude to the engine vibration so that the vibrations cancel each other or the vibrations produced by the balancer assembly causes an overall reduction in vibrations. The intensity of the vibration produced by the balancer assembly is generally determined by the mass of the balancers, which is set by the radius and length of the balancer. Each of the balancers is generally symmetrical with one gear and an identical balance weight to provide calculated countering or suppression vibrations.

One problem with existing balancer assemblies is that the mass required to produce sufficient vibrations makes it difficult to assemble a compact balancer assembly for use in today's compact engines and engine compartments. Most balancer assemblies include balancers with radiuses or lengths that are too large to be easily configured for today's compact engines and engine compartments or are not as effective as desired in reducing engine vibrations. Most balancers are long, bulky, and heavy. Therefore, there is a need for a compact balancer assembly that has sufficient mass to provide sufficient cancellation or suppression of engine vibrations while yet fitting into compact engine compartments.

Another problem with many existing balancer shafts is that the long, bulky, and heavy balancers require bulky, heavy and rigid housings. With the balancers being placed in a housing, and that housing being generally placed within an oil sump, the balancer assemblies, including the housing, require a large portion of the volume of the oil sump on today's compact engines. This may require an increased oil sump size, which may cause problems in today's space restricted engine compartments. Another problem is that due to a large housing, especially when the oil sump has been designed to fit within a compact engine compartment, the maximum oil volume that can be filled into the oil sump is generally less than desired due to the large portion of the oil sump volume required by the housing. The housing for the balancers may also restrict the movement of airflow in and above the oil sump and thereby potentially causes significant power reduction in the engine.

SUMMARY OF THE INVENTION

The present invention relates to a balancer apparatus for suppressing vibrations in an engine and, more particularly, to a compact balancer apparatus which suppresses or cancels inertial force and/or inertial couple forces induced by pistons, connecting rods, shafts and the like when the engine is running. The balancer apparatus can be used on a large variety of internal combustion engines having a various number of pistons, and is particularly suited four cylinder engines and more particularly suited for inline-four cylinder engines.

The balancer apparatus generally includes a first balancer having a first balance weight and a second balancer having a second balance weight, wherein the first and second balance weights are not identical. The first balancer includes a driven gear and a secondary driving gear, while the second balancer includes a secondary driven gear engaging the secondary driving gear. The second balance weight includes a primary balance portion and a secondary balance portion set back from the primary balance portion. More specifically, the primary balance portion and the secondary balance portion define a setback cutout that allows the driven gear to fit within the setback cutout when the first balancer is operationally coupled the second balancer. This interrelationship of the balancers allows for a more compact balancer assembly. Each of the balancers has a center of gravity, and when arranged in the housing, the center of gravities are aligned along the axes. Of course, because the balancer assembly creates vibrations the center of gravities alignment laterally from the axes may be different.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

Figure 1:
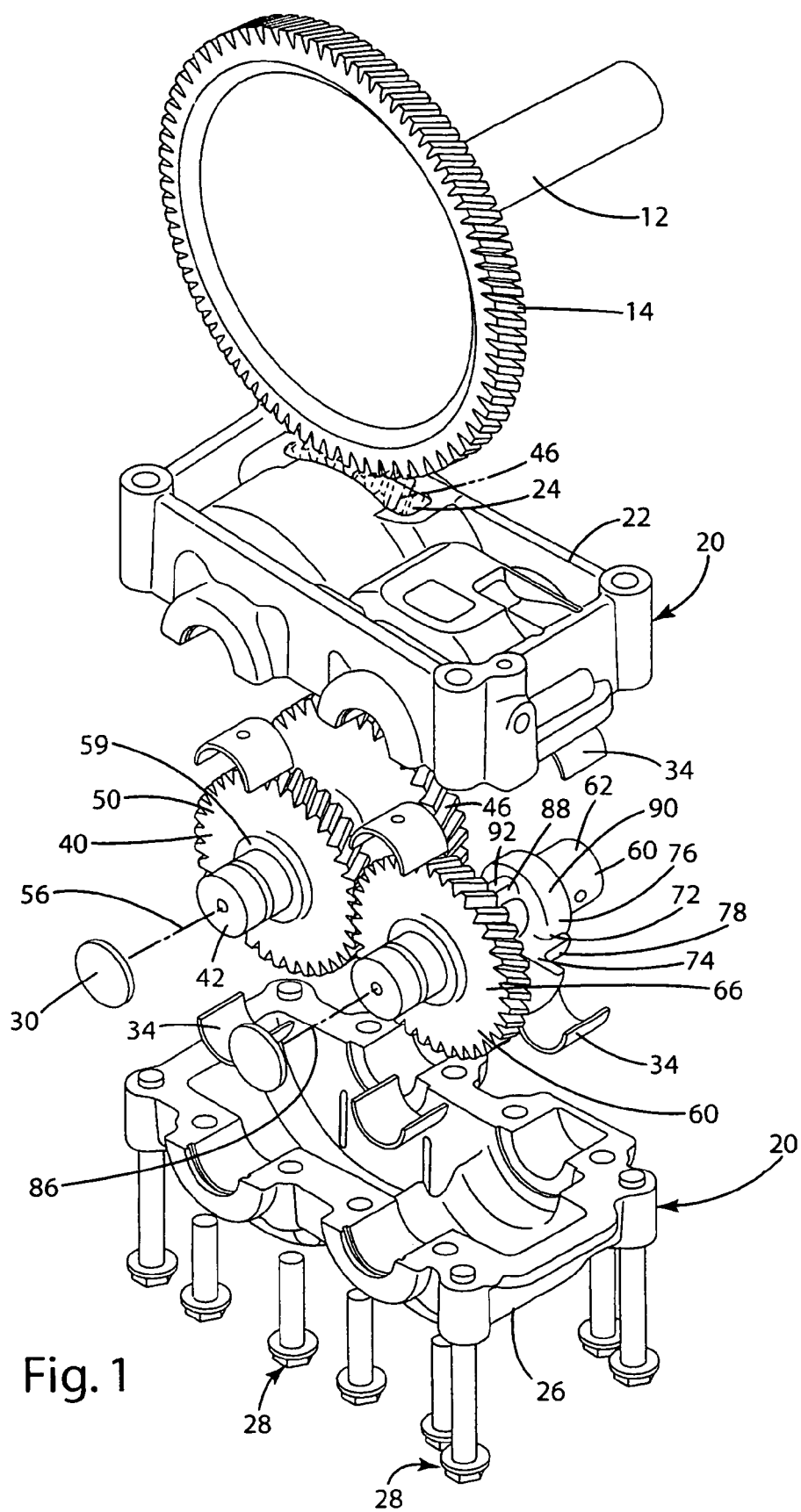
FIG. 1 is an exploded perspective view of the balancer assembly.

A balancer assembly 10, mounted on an internal combustion engine (not shown) and operably connected to the crankshaft 12 of the engine, through the crankshaft gear 14, is illustrated in FIG. 1. The balancer assembly 10 generally includes a first balancer 40 operably coupled to a second balancer 60. The first and second balancers 40, 60 are asymmetrical and secured within a cover assembly 20. The asymmetrical shape of the first and second balancers 40, 60 allows for a compact yet efficient balancer assembly 10 for suppressing or reducing engine vibrations.

The cover assembly 20, as illustrated in FIG. 1, includes an upper cover 22, a lower cover 26, and a fastener assembly 28. The fastener assembly 28 fastens both the upper cover 22 to the lower cover 26 as well as the cover assembly 20 to the engine. In the illustrated embodiment, the upper cover 22 includes a gear recess 24 to allow the crankshaft gear 14 to be coupled to the first balancer 40. The cover assembly 20 may further include end caps 30 and bearings 34 as illustrated in FIG. 1. Of course, the end caps 30 may also be made integral with either the upper cover 22 or the lower cover 26. It should be readily recognizable by one skilled in the art that the balancer assembly 10 may be formed without the upper cover 22 by making portions of the upper cover 22 integral to the engine. Furthermore, the balancer assembly 10 may be formed without the cover assembly 20 if the balancer assembly 10, specifically the first balancer 40 and the second balancer 60, are placed within the envelope of the engine.

As discussed above, the balancer assembly 10 includes a first balancer 40 and a second balancer 60. The first balancer 40 includes a driven gear 46 having a driven gear radius 48 and a secondary driving gear 50. The second balancer 60 includes a secondary driven gear 66 which operably engages the secondary driving gear 50. During operation of the engine, the crankshaft 12 is turned through movement of the pistons within the engine thereby turning the crankshaft gear 14. The crankshaft gear 14 operationally engages the driven gear 46 on the first balancer 40. As the driven gear 46 is rotated by the crankshaft gear 14, the secondary driving gear 50 operationally engaging the secondary driven gear 66 turns the second balancer 60. The first balancer 40 includes a first balance weight 52 and the second balancer 60 includes a second balance weight 72, to create vibrations in the balancer assembly 10 that offset vibrations in the engine thereby canceling, suppressing, or reducing engine vibrations.

Figure 2:
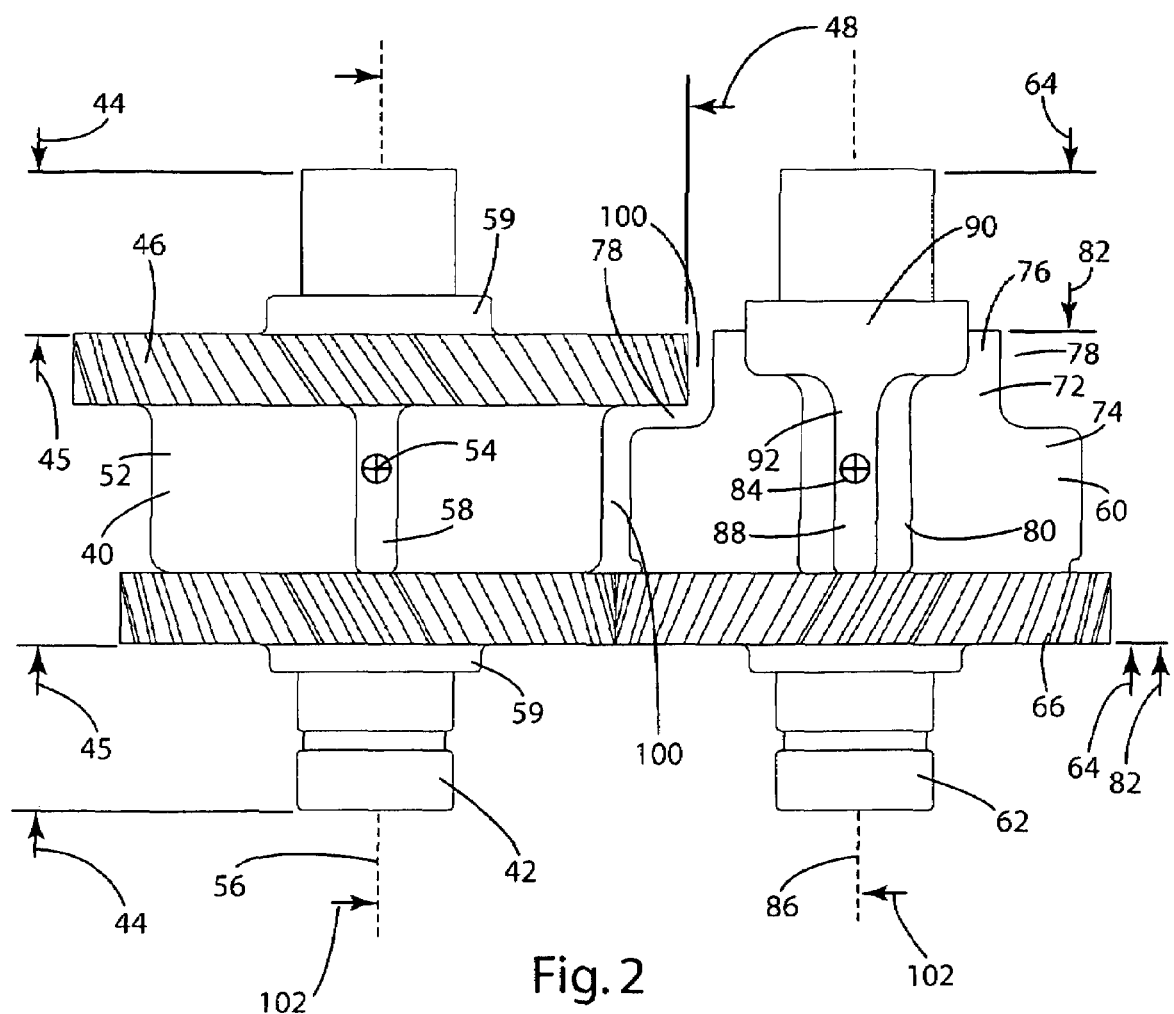
FIG. 2 is a top plan view of the first and second balancers with the balance weights oriented away.
Figures 3, 4:
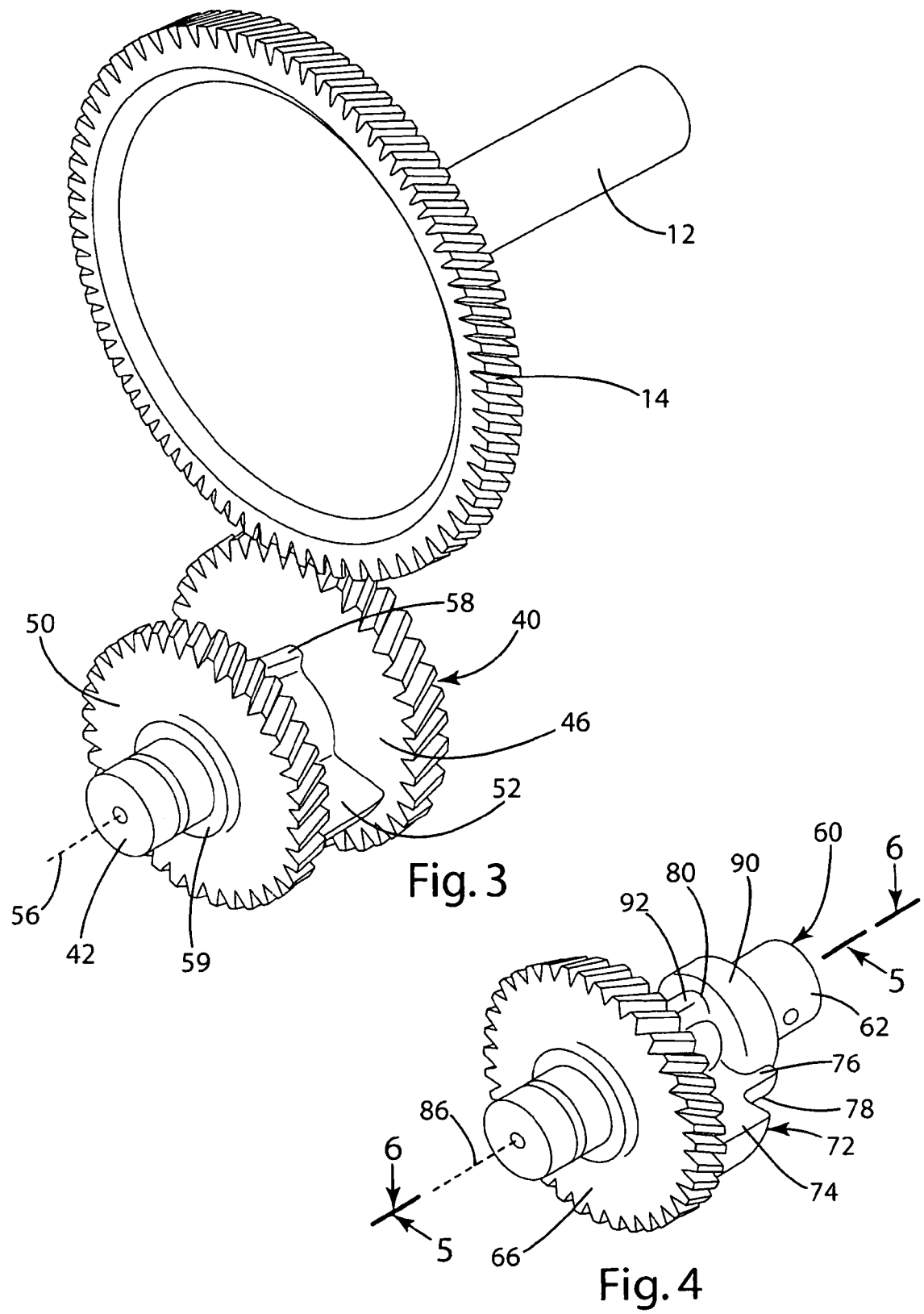
FIG. 3 is a perspective view of the first balancer engaging the crankshaft gear.
FIG. 4 is a perspective view of the second balancer.
Figure 5:
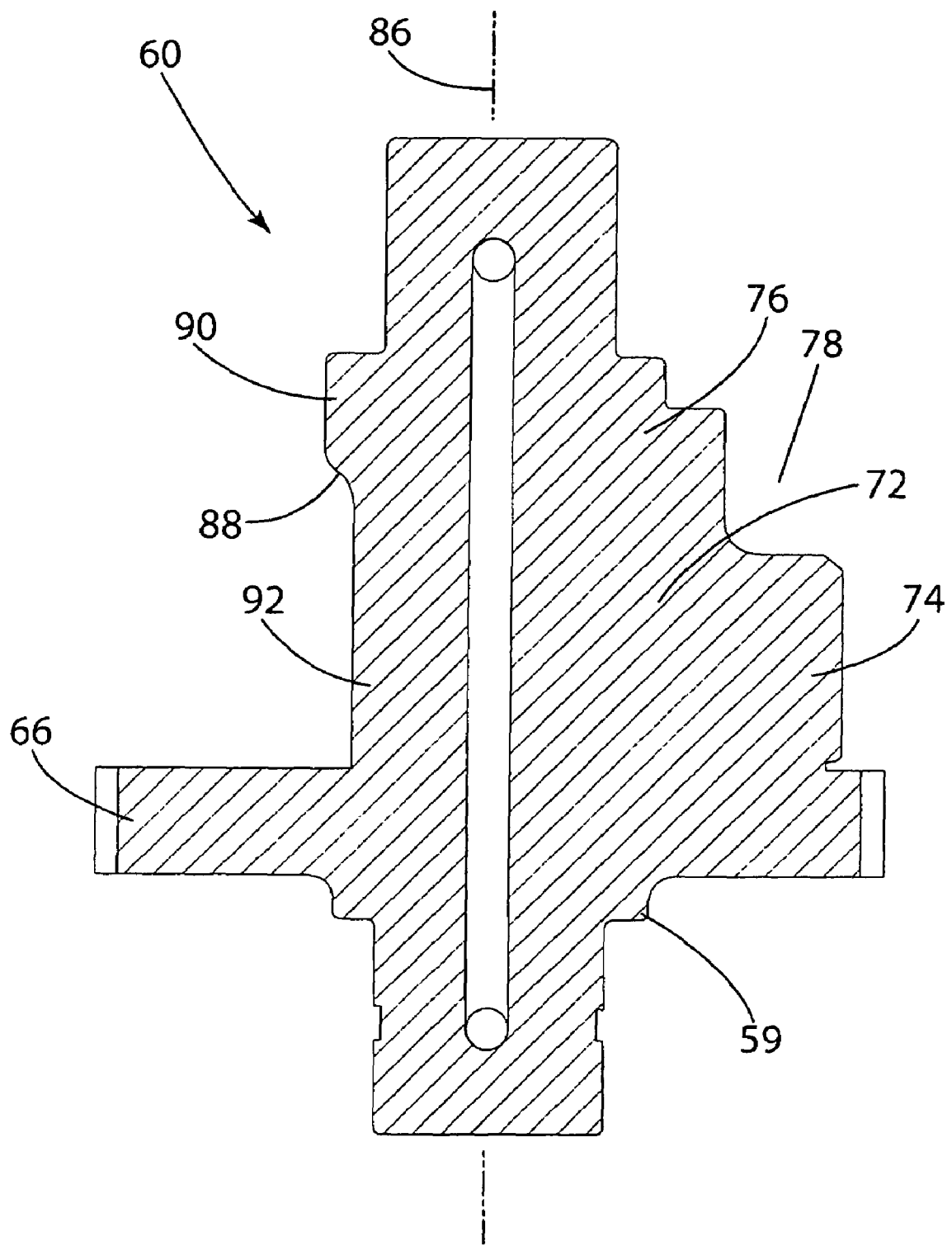
FIG. 5 is a sectional view of the second balancer along lines 5-5 in FIG. 4.

The first balancer 40 includes a first shaft 42 having a first length 44. The driven gear 46 and the secondary driving gear 50 are arranged on the first shaft 42 to have a first longitudinal distance 45, illustrated in FIG. 2 as the distance between the outer edges of the driven gear 46 and the secondary driving gear 50. As further illustrated in FIG. 2, the first balance weight 52 is located between the driven gear 46 and secondary driving gear 50. The first center of gravity 54 is aligned along the first length 44 as shown in FIG. 2. The first balance weight 52 may further include a stiffening rib 58 as illustrated in FIGS. 2 and 3. The stiffening rib 58 stiffens the balancer shaft. Although not illustrated, portions 59 of the shaft 42 may be machined to revise rotational mass or adjust the center of gravity 54 to further adjust the vibration provided by the first balancer 40.

The second balancer 60 generally includes a second shaft 62 having a second axis 86 and a second length 64. In the illustrated embodiment and as shown in FIG. 2, the second length 64 is approximately identical to the first length 44, although the lengths may vary without departing from the spirit of the invention. The second balancer 60 further includes a second balance weight 72. The second balance weight 72 is asymmetrical to the first balance weight 52 or different from the first balance weight 52. By forming the second balance weight 72 asymmetrical to the first balance weight 52, a compact yet efficient balancer apparatus 10 may be formed.

Figure 6:
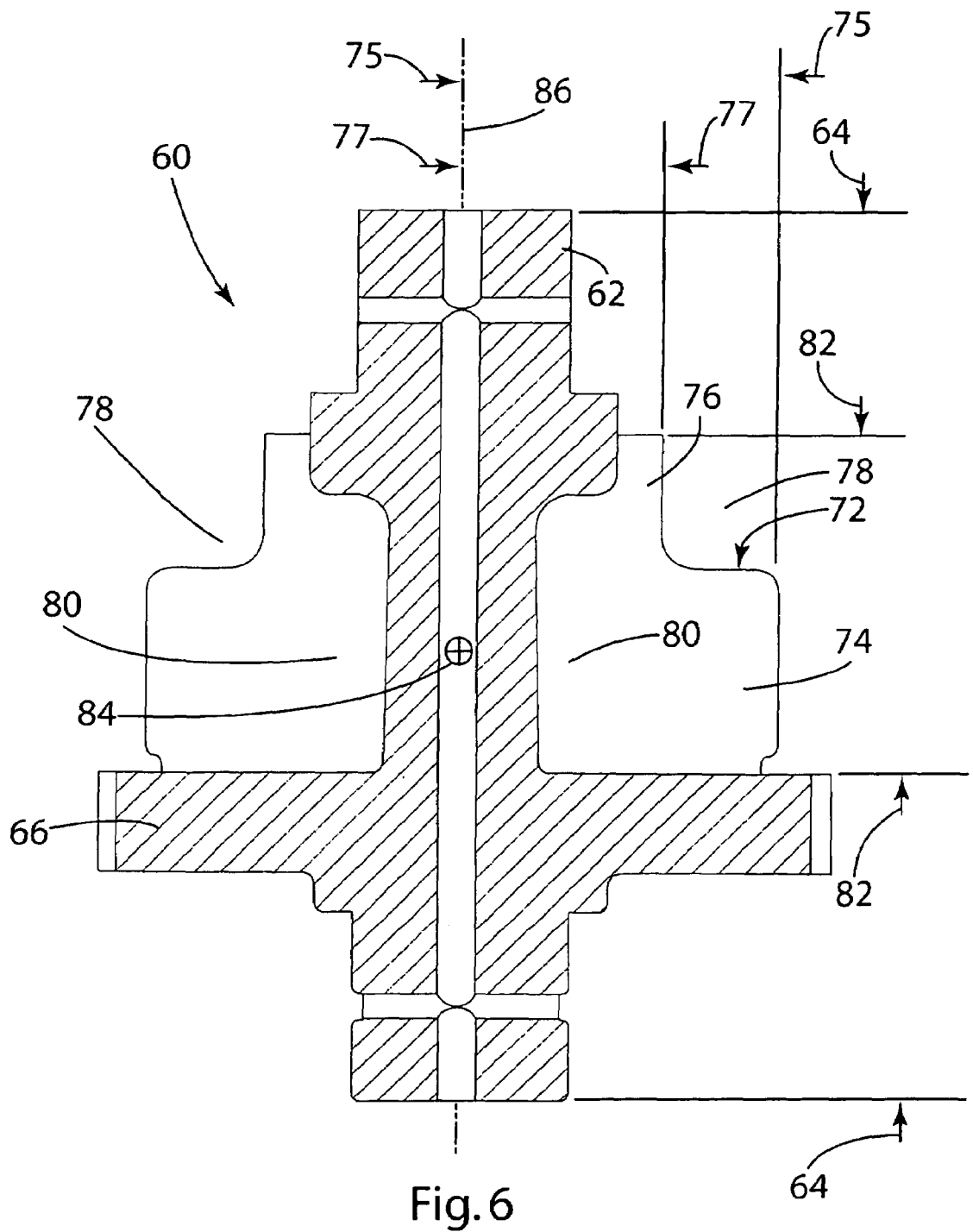
FIG. 6 is a sectional view of the second balancer along lines 6-6 in FIG. 4.

The second balance weight 72 may be generally divided into a primary balance portion 74 having a primary radius 75 and a secondary balance portion 76 having a secondary radius 77. If desired for balancing, the radiuses 75, 77 may vary between the illustrated radius in FIG. 7 and the illustrated radius in FIG. 6. More specifically, if needed, to provide additional balancing, the radius of the balancer can be larger where labeled as 75, 77 in FIG. 7, than in FIG. 6, because the sides of the balancer may be formed or machined to be smaller thereby giving the balance weight a somewhat elliptical rather than circular shape. The secondary balance portion 76 is designed to be cut-out or set back 78 from the primary balance portion 74 thereby allowing the first and second balancers 40, 60 to fit compactly together. The set back or cut-out 78 provides room for the driven gear 46 when the first and second balancers 40, 60 are assembled and rotated within the cover assembly 20 and spaced a minimal lateral distance 102 apart so that the first and second balancers 40, 60 may be placed in a compact arrangement. As illustrated in FIG. 2, the sum of the driven gear radius 48 and the primary radius 75 are greater than the lateral distance 102. Therefore, the cut-out 78 allows the first balancer 40 to be placed in a closer proximity to the second balancer 60 than is possible without the cut-out 78. Furthermore, the primary balance portion 74 may extend toward the first balancer 40 within the circumference that could be defined by the driven gear radius 48, without interfering with the first balancer 40 when they are placed and rotated at the set lateral distance 102.

The second balancer 60 further includes a second center of gravity 84 arranged longitudinally along the second length 64 and a second longitudinal distance 82 which extends along the second length 64 between the outer edge of the secondary driven gear 66 and the outer edge of the second balance weight 72. For efficient and optimal operation, the center of gravities 54, 84 are longitudinally aligned when the balancers 40, 60 are placed within the housing. This alignment may be accomplished by aligning the first center of gravity 54 along the first length 44 at approximately the same point that the second center of gravity 84 is aligned along the second length 64. Even if the center of gravities 54, 84 are not aligned at identical points along the lengths 44, 64, when the balancers 40, 60 are placed within the housing, the center of gravities 54, 84 are aligned longitudinally within the housing. In the illustrated embodiment, the first center of gravity 54 and the second center of gravity 84 are located approximately in the middle of the first and second longitudinal distances or the first and second lengths. This arrangement allows the load from the rotating balancers to be distributed equally to the bearings on both ends. Therefore, the center of gravities 54, 84 are generally longitudinally aligned for efficient operation when placed in the cover assembly 20.

The second balance weight 72 is specifically formed to align the second center of gravity 84 with the first center of gravity 54, longitudinally when assembled into the housing, even though the second balancer 60 does not include a second gear such as the driven gear 46 on the first balancer

Figure 7:
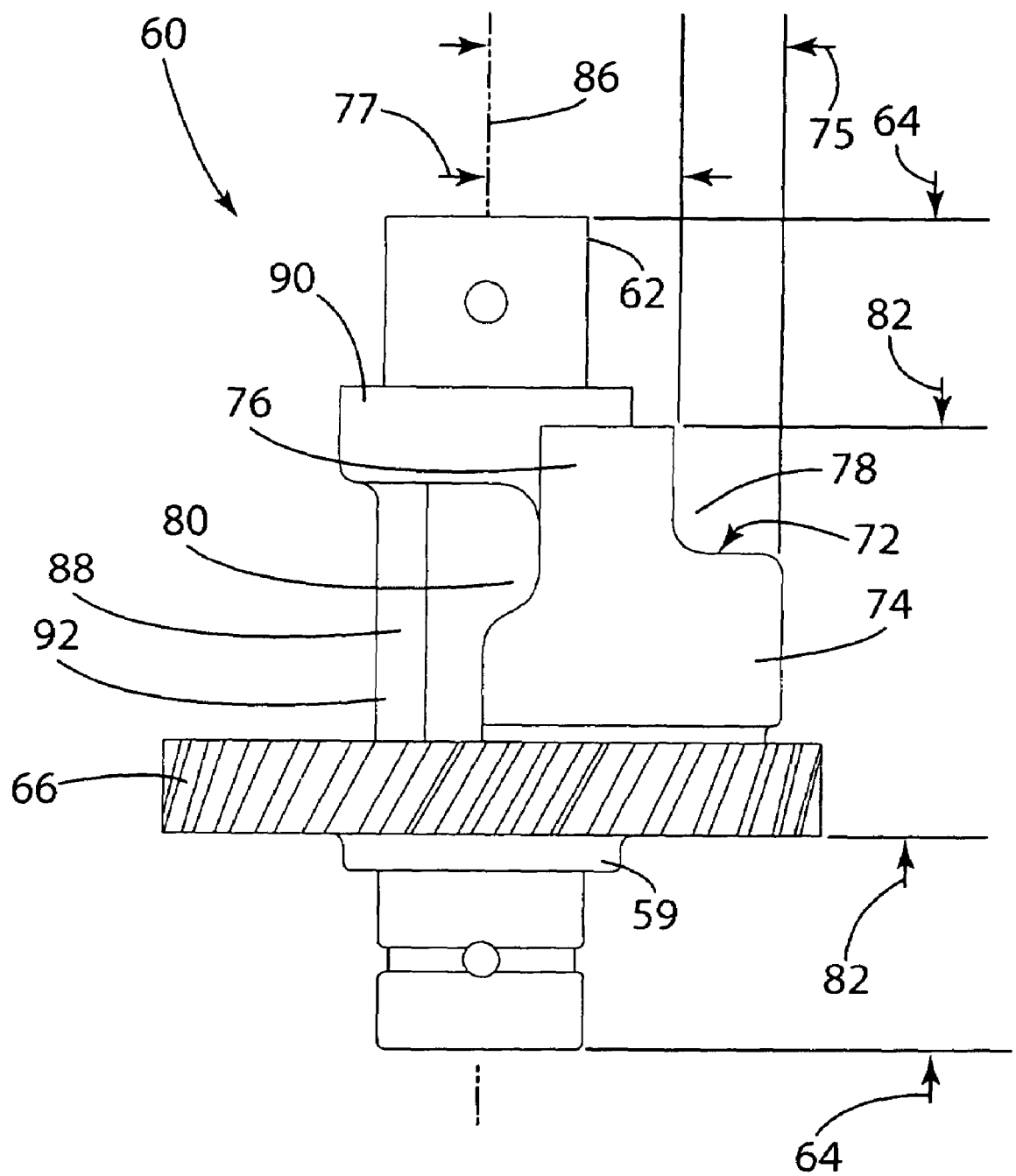
FIG. 7 is a side elevational view of the second balancer.

40. The second center of gravity 84 is partially aligned by a second stiffening rib 88. Even though the secondary balance portion 76 has a secondary radius 77 which is smaller than the primary radius 75 of the primary balance portion 74, the second stiffening rib 88 is designed to compensate for the reduced mass of the second balancer 60 that only has one gear. The second stiffening rib 88 is designed to move the center of gravity into alignment longitudinally with the first center of gravity 54. The second stiffening rib 88 includes a primary stiffening portion 90 and a secondary stiffening portion 92. The primary stiffening portion 90 also strengthens the surface in contact with the housing to prevent the shaft from excessive longitudinal movement. As illustrated in FIGS. 2 and 4, the primary stiffening portion 90 is enlarged from the secondary stiffening portion 92 thereby moving the center of gravity 84 longitudinally along or approximately parallel to the second axis. To further align the center of gravity 84 with the first center of gravity 54, the second balance weight 72 on the primary balance portion 74 and extending into the secondary balance portion 76 defines a recess 80, as illustrated in FIG. 7. This recess 80 provides the final alignment of the second center of gravity 84 to compensate for the reduced secondary radius 77 necessitated by the compact design of the balancer assembly 10. Of course, if needed, further recesses may be drilled or machined to further align the center of gravities 54 and 84.

The compact design of the first and second balancers 40, 60 allows a fairly constant clearance gap 100 as illustrated in FIG. 2 between both the driven gear 46 and the secondary balance portion 76, and the first balance weight 52 and the primary balance portion 74 of the second balance weight 72. The minimization of this clearance gap 100 further ensures that the balancer assembly 10 is as compact as possible.

The balancers are generally formed by nodular cast iron. It is also possible to use powdered metal sintering process for forming the whole balancer 40, 60 or a subassembly of the first and second balancers 40, 60. After the casting or the sintering process, the raw parts will be machined into shape with specified tolerance. As portions of the shaft 42 and 62 will engage the bearings 34, it is desirable to machine these as is well known in the art to prevent excessive wear or excessive friction. The gears 46, 50 and 66 are also machined to specification. Depending on the dimensional stability of the raw part, the balancer outer edge may be machined to provide accurate location of the center of gravity as well as accurate masses for the balancing purposes. Machining generally sets the final location of the first center of gravity 54 and second center of gravity 84 to the desired position. However if the center of gravities are not properly set after machining, further machining such as drilling a small release into the balance weights 52, 72 may be performed to further align the center of gravities 54, 84.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A balancer apparatus for suppressing vibrations in an engine, wherein the engine has a rotatable crankshaft including a driving gear, the balancer apparatus comprising:
   a first balancer including a first balance weight, a driven gear and a secondary driving gear;
   a second balancer including a second balance weight, wherein said first and second balance weights are not identical and wherein said second balance weight includes a primary balance portion and a secondary balance portion set back from said primary balance portion, said primary balance portion and said secondary balance portion defining a setback cutout and wherein said driven gear fits within said setback cutout when said first balancer is operationally coupled to said second balancer.

2. A balancer apparatus for suppressing vibrations in an engine, wherein the engine has a rotatable crankshaft including a driving gear, the balancer apparatus comprising:
   a first balancer including a first balance weight and having a first axis;
   a second balancer including a second balance weight and having a second axis, wherein said first and second balance weights are not identical and wherein said second balance weight includes a primary balance portion having a primary radius and a secondary balance portion having a secondary radius, and wherein said first balancer includes a driven gear having a driven gear radius, said first axis being spaced a lateral distance from said second axis and wherein the sum of said primary radius and said driven gear radius is greater than said lateral distance.

3. A balancer apparatus for suppressing vibrations in an engine, wherein the engine has a rotatable crankshaft including a driving gear, the balancer apparatus comprising:
   a first balancer including a first balance weight, a driven gear and a secondary driving gear and wherein said first balancer shaft includes first longitudinal distance between the outer edges of said driven gear and said secondary driving gear;
   a second balancer including a second balance weight, wherein said first and second balance weights are not identical, and wherein said second balancer has a secondary driven gear and wherein said second balancer has a second longitudinal distance between outer edges of said secondary driven gear and said second balance weight and wherein said first longitudinal distance and said second longitudinal distance are approximately equal.

4. A balancer apparatus for suppressing vibrations in an engine, wherein the engine has a rotatable crankshaft including a driving gear, the balancer apparatus comprising:
   a first balancer including a driven gear and a secondary driving gear; and
   a second balancer including a secondary driven gear engaging said secondary driving gear, said second balancer defining a setback cutout, and wherein said second balancer is coupled to said first balancer in a compact orientation with said driven gear fitting within said setback cutout.

5. The balancer apparatus of claim 4 wherein said second balancer includes a primary balance portion and a secondary balance portion, said secondary balance portion being setback from said primary balance portion to define said setback cutout.

6. The balancer apparatus of claim 5 wherein said primary balance portion has a primary radius and said secondary balance potion has a secondary radius, said primary radius being larger than said first radius.

7. The balancer apparatus of claim 4 wherein said first balancer includes a first balance weight and said second balancer includes a second balance weight asymmetrical to said first balance weight.

8. The balancer apparatus of claim 7 wherein said first balancer includes a first axis and a first center of gravity and wherein said second balancer includes a second axis and a second center of gravity and wherein said first and second center of gravities are aligned longitudinally along said first and second axes.

9. The balancer apparatus of claim 4 wherein said first balancer includes a first axis and a first balance weight arranged between said driven gear and said secondary driving gear and wherein said second balancer includes a second axis and a second balance weight, said first balancer having a first longitudinal extent along said first axis and between the outer edges of said driven gear and said secondary driving gear and wherein said second balancer includes a second longitudinal extent along said second axis and between the outer edges of said secondary driven gear and said second balance weight, said first and second longitudinal extents being approximately equal.

10. The balancer apparatus of claim 4 wherein said second balancer includes a second balance weight having a recess.

11. The balancer apparatus of claim 10 wherein said second balance weight has a primary balance portion and a secondary balance portion, said primary balance portion defining said recess.

12. A balancer apparatus for suppressing vibrations in an engine, wherein the engine has a rotatable crankshaft including a driving gear, the balancer apparatus comprising:
a first balancer including a first balance weight, a driven gear en a in said driving gear and a secondary driving gear;
a second balancer including a second balance weight, a secondary driven gear engaging said secondary driving gear and wherein said first and second balance weights are not identical.

13. The balancer apparatus of claim 12 wherein said first balancer has a first center of gravity and said second balancer shaft has a second center of gravity and wherein each of said balancers includes a longitudinal extent, said center of gravities being equally aligned along said longitudinal extent.

14. The balancer apparatus of claim 12 wherein said first balance weight includes a stiffening rib.

15. The balancer apparatus of claim 12 wherein said second balance weight includes a primary balance portion and a secondary balance portion, said primary balance portion including a recess, said second balancer having a second center of gravity and a second axis and wherein said recess adjusts said second center of gravity longitudinally along said second axis.

16. A balancer apparatus for suppressing vibrations in an engine, wherein the engine has a rotatable crankshaft including a driving gear, the balance apparatus comprising:
a first balancer having a driven gear engaging the driving gear, a secondary driving gear, a first axis and a first center of gravity; and
a second balancer having a secondary driven gear engaging said secondary driving gear, a second axis and a second center of gravity, wherein said center of gravities are aligned longitudinally along said first and second axes.

17. The balancer apparatus of claim 16 wherein said second balancer includes a recess configured to align the second center of gravity of the second balancer longitudinally with the first center of gravity of the first balancer.

18. The balancer apparatus of claim 16 wherein said second balancer includes a second balance weight having a primary balance portion and a secondary balance portion, said primary balance portion having a primary radius and said secondary balance portion having a secondary radius, said secondary radius being larger than said primary radius.

19. The balancer apparatus of claim 18 wherein said second balance weight further includes a stiffening rib extending along said second axis and opposite said primary balance portion and said secondary balance portion.

20. The balancer apparatus of claim 18 wherein said primary balance portion has a primary longitudinal length and said secondary balance portion has a secondary longitudinal length, and wherein said primary longitudinal length and said secondary longitudinal length are selected to align said second center of gravity with said first center of gravity.

21. The balancer apparatus of claim 20 wherein said primary longitudinal length and said secondary longitudinal length are not equal.

* * * * *

UNITED STATES PATENT AND TRADEMARK OFFICE
CERTIFICATE OF CORRECTION

PATENT NO.       : 7,296,553 B2                                  Page 1 of 1
APPLICATION NO.  : 11/545358
DATED            : November 20, 2007
INVENTOR(S)      : Azmi B. Osman It is certified that error appears in the above-identified patent and that said Letters Patent is hereby corrected as shown below:

Column 7, line 27, Claim 12, after "gear" (first occurrence), "en a in" should be -- engaging --.

Signed and Sealed this

Eighth Day of April, 2008

JON W. DUDAS
*Director of the United States Patent and Trademark Office*